(12) United States Patent
Li et al.

(10) Patent No.: US 10,334,039 B2
(45) Date of Patent: Jun. 25, 2019

(54) NETWORK DEVICE CLUSTERS

(71) Applicant: Symantec Corporation, Mountain View, CA (US)

(72) Inventors: Qing Li, Cupertino, CA (US); Min Hao Chen, Milpitas, CA (US); Haibiao Fan, Hayward, CA (US); Wenjing Wang, Sunnyvale, CA (US); Chris Ciborowski, San Jose, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 259 days.

(21) Appl. No.: 15/234,766

(22) Filed: Aug. 11, 2016

(65) Prior Publication Data
US 2018/0048704 A1   Feb. 15, 2018

(51) Int. Cl.
*H04L 29/08* (2006.01)
*H04L 12/725* (2013.01)
(Continued)

(52) U.S. Cl.
CPC ...... *H04L 67/1053* (2013.01); *H04L 29/0836* (2013.01); *H04L 29/08396* (2013.01);
(Continued)

(58) Field of Classification Search
CPC ......... H04L 45/00; H04L 45/02; H04L 45/08; H04L 45/10; H04L 45/14; H04L 45/16; H04L 45/24; H04L 45/26; H04L 45/34; H04L 45/46; H04L 45/48; H04L 47/34; H04L 41/5003; H04L 45/302; H04L 47/805; H04L 65/80; H04L 67/322
See application file for complete search history.

(56) References Cited

U.S. PATENT DOCUMENTS 8,130,747 B2   3/2012 Li et al.
2007/0217406 A1* 9/2007 Riedel ................ H04L 47/14
                                                           370/389

(Continued)

OTHER PUBLICATIONS

Qing Li, *A Novel Approach to Manage Asymmetric Traffic Flows for Secure Network Proxies*, Blue Coat Systems, Inc., Sunnyvale, CA, USA, pp. 196-209, © IFIP International Federation for Information Processing 2008.

*Primary Examiner* — Ashley Shivers
(74) *Attorney, Agent, or Firm* — Maschoff Brennan

(57) ABSTRACT

In certain embodiments, a method comprises forming a cluster of peered network devices comprising a plurality of three or more peered network devices and a plurality of control information connections between pairs of the peered network devices. The method further comprises classifying a connection by associating the connection with an application, wherein a first peered network device associated with the cluster classifies the connection based at least in part on sequential payload packets associated with the connection, at least some of which the first device receives from other peered network devices associated with the cluster. The method also comprises sending control information over one of the control information connections between the first peered network device and a second peered network device associated with the cluster, wherein the control information comprises information regarding the classification of the connection.

23 Claims, 8 Drawing Sheets

(51) Int. Cl.
*H04L 12/927* (2013.01)
*H04L 12/26* (2006.01)
*H04L 12/851* (2013.01)
*H04L 12/715* (2013.01)

(52) U.S. Cl.
CPC .... *H04L 29/08531* (2013.01); *H04L 43/0894* (2013.01); *H04L 45/302* (2013.01); *H04L 45/306* (2013.01); *H04L 45/46* (2013.01); *H04L 47/24* (2013.01); *H04L 47/2441* (2013.01); *H04L 47/805* (2013.01); *H04L 67/1042* (2013.01)

(56) References Cited

U.S. PATENT DOCUMENTS

| | | | |
|---|---|---|---|
| 2007/0283023 A1* | 12/2007 | Ly | H04L 69/16 709/227 |
| 2009/0040926 A1* | 2/2009 | Li | H04L 41/0893 370/230.1 |
| 2012/0226820 A1 | 9/2012 | Li et al. | |
| 2013/0142038 A1* | 6/2013 | Pan | H04L 47/25 370/230 |
| 2015/0195823 A1* | 7/2015 | Seo | H04W 72/0406 370/329 |
| 2017/0181149 A1* | 6/2017 | Ang | H04L 5/003 |

* cited by examiner

NETWORK DEVICE CLUSTERS

TECHNICAL FIELD

The present disclosure relates generally to network devices, and more specifically to network device clusters.

BACKGROUND

Network devices, for example, a server or other device, may process network traffic connections traveling between two entities, such as between a client and a host server. In certain instances, two network devices may be clustered together as peers using a direct connection, such as a cross-over cable, and may send duplicate traffic to each other to share information. In such instances, an individual peered network device may not have all, and may be missing significant portions of, the information available regarding the entire cluster and network traffic of interest. It may be beneficial to create more efficient and effective network device clusters that can handle, access, and store information regarding network traffic across numerous network device peers in different locations, and that can more efficiently and effectively operate in various situations.

SUMMARY OF THE DISCLOSURE

According to one embodiment, a method comprises forming a cluster of peered network devices comprising a plurality of three or more peered network devices and a plurality of control information connections between pairs of the peered network devices. The method further comprises classifying a connection by associating the connection with an application, wherein a first peered network device associated with the cluster classifies the connection based at least in part on sequential payload packets associated with the connection, at least some of which the first device receives from other peered network devices associated with the cluster. The method also comprises sending control information over one of the control information connections between the first peered network device and a second peered network device associated with the cluster, wherein the control information comprises information regarding the classification of the connection.

In some embodiments, the control information contains policy information (such as QoS policy) associated with the connection.

In accordance with the present disclosure, certain embodiments may provide one or more technical advantages. For example, particular embodiments may allow for the efficient and orderly formation and growth of clusters containing numerous peered network devices (peers). In addition, clusters according to some embodiments of this disclosure may enable its constituent peers to classify network traffic connections, and/or to make such classifications more efficiently or effectively, e.g., based on applications associated with the network traffic connections. Such benefits may be provided in asymmetrically routed environments. Furthermore, some embodiments may increase the ability of peers to quickly and efficiently share information regarding operation of the cluster and/or network traffic, e.g., packet statistics and other information. Similarly, some embodiments allow individual peers in a cluster to make more complete reports (e.g., run-time reports) regarding some or all of the peers (or the cluster), as each peer may have some or all of the information regarding the operation and/or network traffic associated with other peers in the cluster. Certain embodiments may also allow a first peer to obtain statistics and other information from other peers without requiring the other peers to forward as much (or any) network traffic to the first peer, thus increasing the efficiency and performance of the peers and freeing bandwidth and processing resources. Certain embodiments also do not require a direct connection (such as a cross-over cable) and allow some of all of the peers to be on different networks from one another and/or multiple network device (e.g., routing) hops from one another, which may allow for a more distributed, customizable, and/or flexible cluster architecture. In addition, some embodiments allow each peer to receive and store information regarding other peers (for example in batches, real time, or near real time). Thus, in particular embodiments, when one peer goes down (offline), another peer may have some or all of the downed peer's historical information such that the online peer can efficiently and effectively manage some or all of the downed peer's network connections. Moreover, the online peer may also continue to maintain and update the downed peer's information while the downed peer is offline, such that the downed peer can more quickly and effectively resume operation once it comes back online.

Some embodiments of this disclosure may also allow for better information sharing among different network segments, which may allow, for example, better malware detection, as well as a more holistic view of the operation of both the cluster and the portions of the network(s) it serves. For example, the better information sharing may allow for more efficient device and network configurations to maximize network resources.

In addition, particular embodiments of this disclosure may allow for more than two peers to operate in a cluster, and for that cluster to achieve some or all of the other benefits of this disclosure, both described herein and readily apparent to a person of ordinary skill in the art. In certain embodiments, the lower the latency between peers, the more pronounced certain technical advantages may become. Some embodiments of the present disclosure may also enable a cluster to operate as an intelligent application based load balancer, enable real-time infrastructure traffic monitoring and reporting, and/or enable dynamic policy provisioning. Other technical advantages will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DISCLOSURE

Creating more efficient and effective network device clusters that can handle, access, and store information regarding network traffic across numerous network device peers in different locations, and that can more efficiently and effectively operate in various situations, e.g. in networks with asymmetrically routed traffic, may be beneficial in transmitting and managing network traffic. While certain existing network device clusters may be used to transmit and manage network traffic, they are limited in many respects. New clusters of peered network devices are needed that enable more than two peers to form an effective and efficient cluster. Individual peers in a cluster need the ability to operate while located remotely from one another, even on different networks (e.g., different IP networks), and even if peers are multiple network routing hops away from each other. Furthermore, individual peers in a cluster need the ability to share information regarding network activity with one another, such that any one peer has all relevant network activity information stored by its other peers. Such information sharing may enable each peer to report on cluster network activity and to provide backup information in the event other peer(s) go down (offline). Likewise, individual peers need the ability to efficiently share information without duplicating and sending large quantities of duplicate network traffic to peers. New clusters also need to be able to classify network traffic connections (that took asymmetrical paths in the forward and reverse traffic directions) as being associated with specific applications so that network reports can be created and so that quality of service and rate control policies can be enforced on specific network traffic connections. In addition, new clusters are needed that provide some or all of the technical advantages enumerated in this disclosure and other technical advantages readily apparent to a person of ordinary skill in the art. Various embodiments of this disclosure may provide some, all, or none of these functions or benefits.

To facilitate a better understanding of the present disclosure, the following provides examples of certain embodiments. The following examples are not to be read to limit or define the scope of the disclosure. Embodiments of the present disclosure and its advantages may be understood by referring to FIGS. 1A through 3E, where like numbers are used to indicate like and corresponding parts.

Figure 1A:
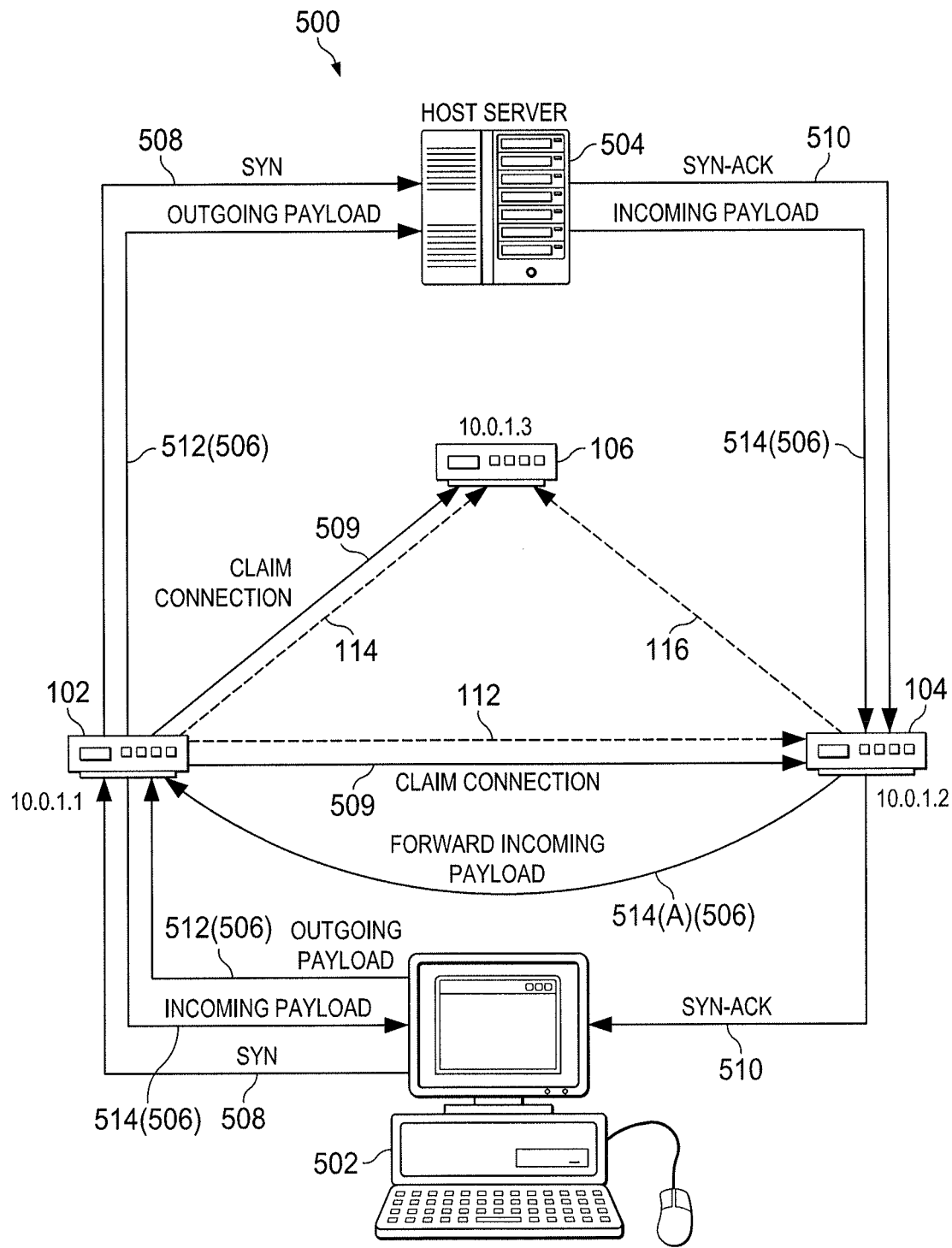
FIGS. 1A and 1B illustrate a system containing a cluster (e.g., the cluster of FIG. 3A) of peered network devices that is initiating, classifying, and processing a connection, according to an example embodiment.

Additional details of the systems and methods of FIGS. 1A-2B are described below with regard to FIGS. 3A-3E FIGS. 1A and 1B illustrate a system 500 containing a cluster (e.g., cluster 100 of FIG. 3A) of peered network devices that is initiating, classifying, and processing a connection, according to an example embodiment. Specifically, FIG. 1A illustrates system 500 having a client 502, a host server 504, and multiple peered network devices 102, 104, and 106 initiating and classifying a connection (e.g., connection 506), according to an example embodiment. In the example embodiment of FIG. 1A, connection 506 is initiated via multiple messages to and from multiple components of system 500, including a SYN (synchronize) message 508 and a SYN-ACK (synchronize-acknowledgement) message 510. In the example embodiment of FIG. 1A, connection 506 has two halves: an outgoing payload half 512 and an incoming payload half 514.

In general, first peer 102, second peer 104, and third peer 106 are part of a cluster of peered network devices. Additional details of peers 102, 104, and 106 are as described with regard to FIGS. 3A, 3B, 3C, and 3D. For example, peers 102, 104, and 106 are connected as part of a cluster, which is indicated in FIG. 1A, e.g., by initial connections 112, 114, and 116. In particular embodiments, a cluster, such as the cluster formed by peers 102, 104, and 106, exists before a connection (e.g., connection 506) is initiated via, or processed by, a peer.

In general, client 502 is a device that receives, initiates, or forwards a connection, such as connection 506, through a cluster. In example embodiments, client 502 may be a computer (e.g., a PC, mobile device, etc.), server, gateway, session border controller, database, and/or any suitable device.

Similarly, in general, host server 504 is a device that receives, responds to a connection initiation, or forwards a connection, such as connection 506, through a cluster. While host server 504 is labeled as a "server," it may be any appropriate device. For example, host server 504 may be a computer (e.g., a PC, mobile device, etc.), server, gateway, session border controller, database and/or any suitable device. In certain embodiments, client 502 and host server 504 represent endpoints for connection 506. In other embodiments, client 502, server 504, or both may be intermediate devices that forward portions of connection 506 to other ultimate endpoint(s).

In the example of FIG. 1A, client 502 initiates connection 506, though other devices, such as host server 504, may initiate a connection. In general, client 502 begins initiating a connection by sending an initiation message. In the example of FIG. 1A, connection 506 is a TCP connection (though any other suitable connection protocol may be used), and the initiation message is SYN message 508. In this example, client 502 may send SYN message 508 to a clustered peer network device, such as first peer 102. In response, first peer 102 may send SYN message 508 to host server 504.

Additionally, in response to first peer 102 receiving SYN message 508, first peer 102 may send a claim connection message 509 to other peers in the cluster, such as second peer 104 and third peer 106. In general, claim connection message 509 informs other peers that a new connection has arrived, and that the sender of claim connection message 509 is claiming the connection (e.g., connection 506) for classification purposes. In certain embodiments, classifying a connection such as connection 506, particularly by associating it with an application (e.g., identifying connection 506 as a VoIP call, an instant message, a browser request, etc.). In such embodiments, classification may require or benefit from one peer in a cluster obtaining all of the payload traffic (e.g., packets) associated with connection 506 until classification is complete. Moreover, in certain embodiments, classification may require or benefit from one peer obtaining sequential payload packets (i.e., receiving each packet of connection 506 having a network traffic payload in sequence—the first packet, second packet, third packet, etc.) until classification is complete. In the example of FIG. 1A, by sending claim connection message 509, first peer 102 claims connection 506 for classification purposes.

In the example of FIG. 1A, host server 504, upon receiving the initiation message (e.g., SYN message 508) from first peer 102, sends an acknowledgement of the initiation message (e.g., SYN-ACK message 510) back to client 502. In general, host server 504 responds to an initiation message by sending an acknowledgement message back to client 502. In the example embodiment of FIG. 1A, connection 506 is a TCP connection (though any other suitable connection protocol may be used), and the acknowledgement message is SYN-ACK message 510. In general, SYN-ACK message 510 is a message that acknowledges receipt of SYN message 508 and assists in initiating a connection (e.g., connection 506) according to TCP protocol. In this example in FIG. 1A, host server 504 sends SYN-ACK message 510 to second peer 104. In response, second peer 104 may send SYN-ACK message 510 to client 502. The scenario of connection initiation SYN message 508 reaching peer 102 while response SYN-ACK message 510 reaches peer 104, with peer 102 residing on a different network or network segment from that on which peer 104 resides, represents an example embodiment of asymmetric traffic flow.

In particular embodiments, the acknowledgement of the initiation message (e.g., SYN-ACK message 508) is sent to a different peer than sent the initiation message. Thus, in certain embodiments, one peer of a cluster handles one half of the initiation of connection 506, while another peer of the cluster handles the other half of the initiation connection 506, which is an example of asymmetric connection initiation.

In certain embodiments, in response to client 502 receiving SYN-ACK message 510, client 502 may send an ACK (acknowledgement) message to host server 504, which may follow the same path as SYN message 508. In general, the ACK message acknowledges receipt of SYN-ACK message 510 by client 502.

Figure 1B:
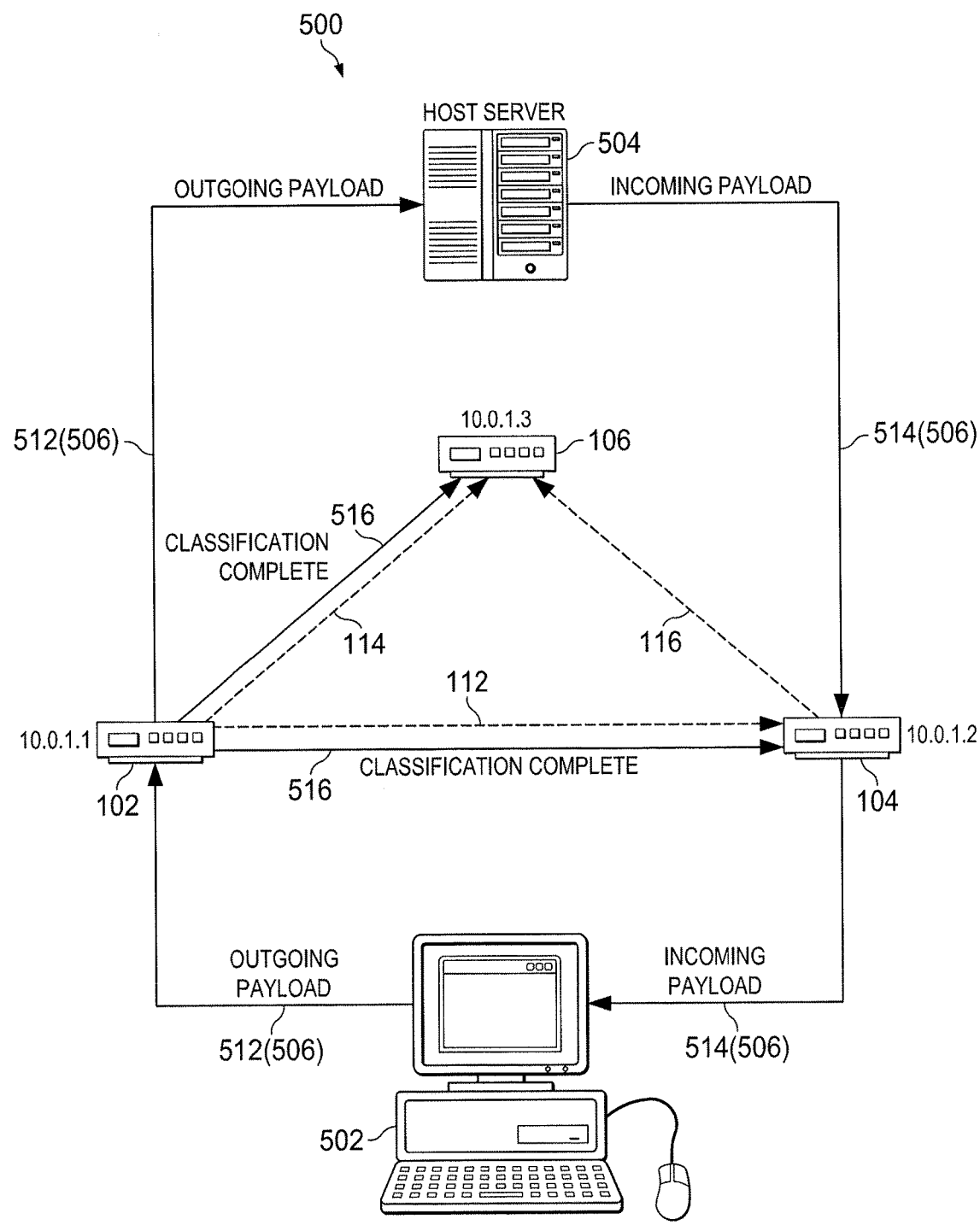

Additionally, in response to host server 504 receiving SYN message 508 and/or the ACK message, host server 504 may send payload packets (e.g., as part of incoming payload half 514) to client 502. In some embodiments, the payload packets sent by host server 504 may be the first payload packets of connection 506. In other embodiments, the first payload packets of connection 502 may come from client 502. In certain embodiments, sequential payload packets (including the first payload packet) may be sent by host server 504, client 502, or both, as part of connection 506. In the example of FIG. 1A, host server 504 sends the first payload packet, via incoming payload half 514, to second peer 104. In certain embodiments, second peer 104 may forward (see 514(A)) payload packets from incoming payload half 514 to first peer 102, for example, if first peer 102 sent second peer 104 a claim connection message 509 regarding connection 506. In particular embodiments, second peer 104 may forward all payload packets from incoming payload half 514 to first peer 102, at least until connection 506 is classified (e.g., by first peer 102). Once connection 506 is classified (e.g., associated with a particular application), packet forwarding by second peer 104 may cease in some embodiments, as shown in FIG. 1B.

In the example of FIG. 1A, in response to receiving forwarded incoming payload 514(A) from second peer 104, first peer 102 may use the forwarded incoming payload 514(A) to classify connection 506. In addition, first peer 102 may send forwarded packet payloads 514(A) to client 502. In certain embodiments, client 502 and/or a user of client 502 is unaware of packet forwarding and/or receives all expected payloads of incoming payload half 514 of connection 506.

Additionally, in response to client 502 receiving SYN-ACK message 510 and/or a packet via incoming payload half 514, client 502 may send payload packets via outgoing payload half 512, in some embodiments. In the example of FIG. 1A, outgoing payload half 512 is handled by first peer 102, which sends packets associated with outgoing payload half 512 to host server 504. In certain embodiments, during classification of connection 506, first peer 102 receives sequential payload packets associated with connection 506. In such embodiments, first peer 102 may use information gathered from sequential payload packets associated with connection 506 to classify connection 506 (e.g., to associate connection 506 with a particular application).

While the example of FIG. 1A contains certain example components of system 500 in particular configurations, any other suitable configuration of components is contemplated by this disclosure. As merely one example, third peer 106 (or a fourth or fifth peer, etc.) may have initially received the initiation message (e.g., SYN message 508), and therefore third peer 106 (or the fourth or fifth peer, etc.) may have operated in some or all of the ways first peer 102 operated in the disclosed example of FIG. 1A. Similarly, connection 506 may be routed in any suitable manner through any number of suitable components in any order. For example, incoming payload half 514 may send some payload packets first to third peer 106 and other payload packets first to second peer 104, which may cause both third peer 106 and second peer 104 to forward payload packets to first peer 102 in order for first peer 102 to receive sequential payload packets. In addition, connection classification may classify connections according to any suitable criteria. In certain embodiments, clustered peer devices (e.g., peers 102, 104, and/or 106) may classify connections in an asymmetrically routed environment, a load-balancing environment, and/or a high-availability environment.

In the example of FIG. 1A, once first peer 102 successfully classifies connection 506, system 500 may stop forwarding payload packets, and may initiate or resume normal connection processing, as described, for example, in FIG. 1B.

FIG. 1B illustrates system 500, having the same component configuration as in FIG. 1A, completing classification of a connection (e.g., connection 506), according to an example embodiment. After classifying connection 506, peers 102, 104, and 106 may resume or initiate normal processing of connection 506 (i.e., cease forwarding payload packets to each other as part of connection classification), for example, by using a classification complete message 516.

In general, a classification complete message 516 informs recipient peers that classification of a particular connection is complete. In response, recipient peers may cease forwarding payload packets to other peers as part of connection classification in certain embodiments. In the example of FIG. 1B, system 500 illustrates peer 102 informing peers 104 and 106 that classification of connection 506 is complete via classification complete message 516. In response, second peer 104 ceases forwarding payload packets to first peer 102 as part of connection classification. In some embodiments, once such payload packet forwarding ceases, clustered peers (e.g., peers 102, 104, and 106) may resume or initiate normal processing of connection 506 according to the configuration of the clustered peers. For example, the clustered peers may process connections in an asymmetrically routed environment, a load-balancing environment, and/or a high-availability environment.

Figure 3A:
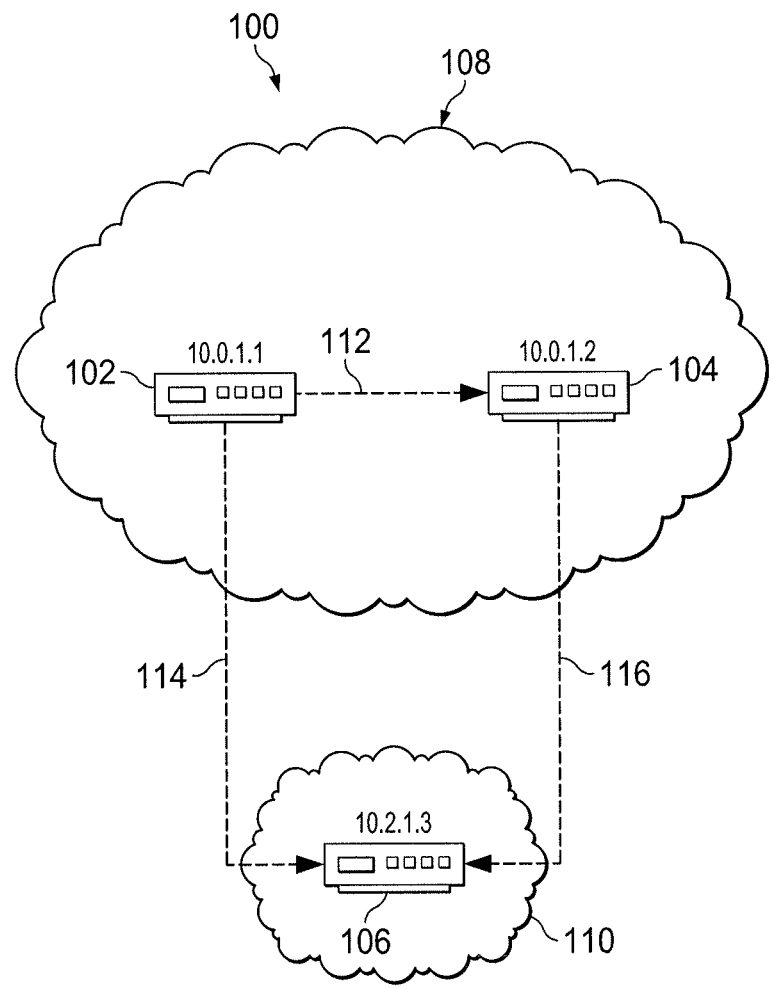
FIG. 3A illustrates a cluster of peered network devices, including initial connections between peers, according to an example embodiment.
Figure 3B:
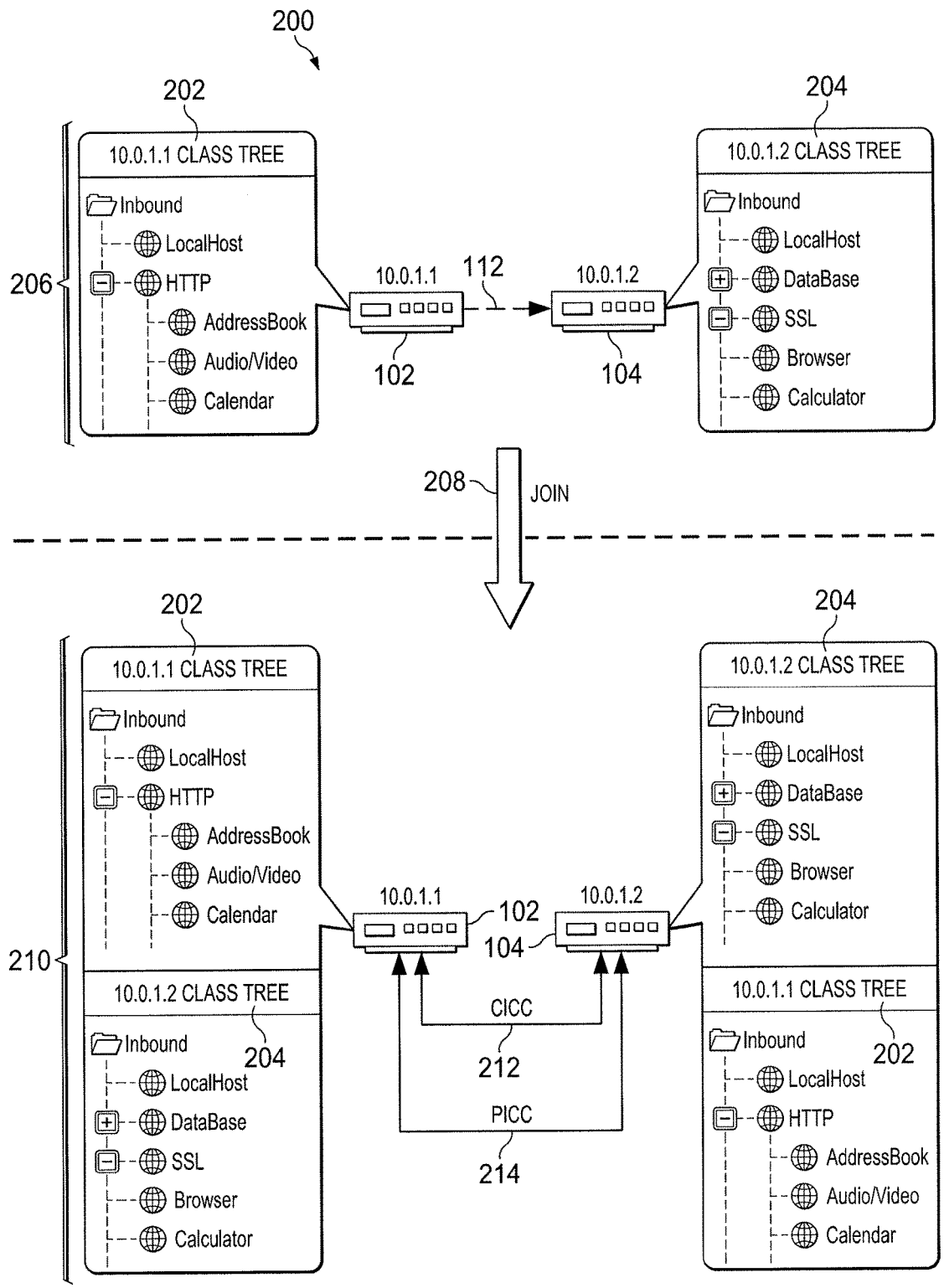
FIG. 3B illustrates a pair of peers, such as two of the peers of FIG. 3A, connecting with each other, establishing cluster membership, and exchanging control information, according to an example embodiment.
Figure 3C:
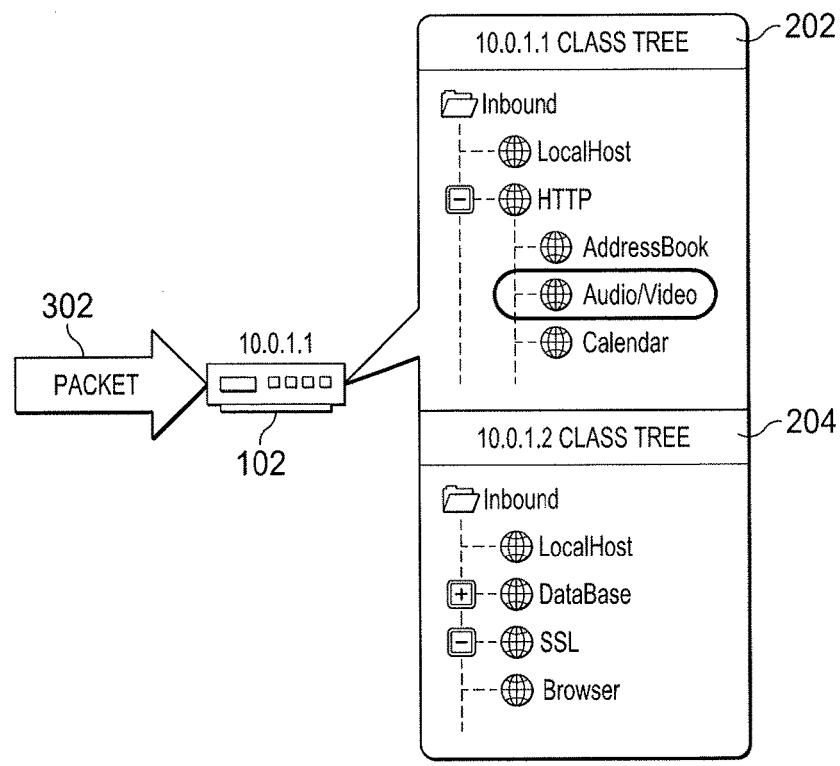
FIGS. 3C and 3D illustrate clustered peered network devices of FIGS. 3A and 3B updating control information in response to receiving local data traffic, according to an example embodiment.
Figure 3D:
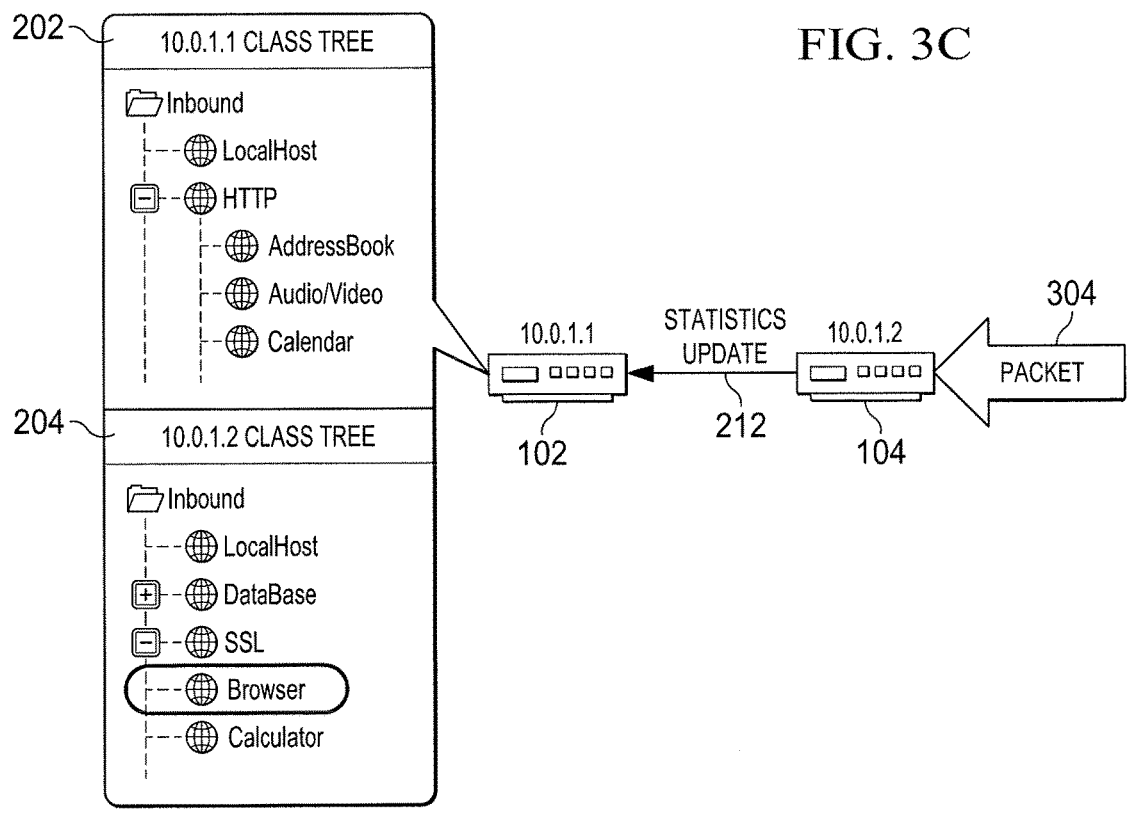

Once classification of a connection, such as connection 506 ceases, one or more of the clustered peers (e.g., peers 102, 104, and/or 106) may update their local control information (e.g., their local class tree (application classification tree)) and/or send updates to other peers containing control information with the classification of the connection and any other control information, e.g., as described regarding FIGS. 3C and 3D.

The example of FIG. 1B shows an embodiment of asymmetric routing of a connection (an example asymmetric routing environment). Connection 506 is shown in FIG. 1B as two connection halves: outgoing payload half 512 and incoming payload half 514, where outgoing payload half 512 is handled by first peer 102 and incoming payload half 514 is handled by second peer 104. While this configuration and operation shows one example of asymmetric routing, and suitable implementation of asymmetric routing is contemplated.

In addition, in certain embodiments, once the peers (e.g., peers 102, 104, and/or 106) of system 500 complete classifying connection 506, the peers may implement/enforce quality of service (QoS) and/or rate control policies on connection 506.

In particular embodiments, QoS enforcement involves defining a QoS policy, such as "guaranteeing application X 512 kbps bandwidth," "block applications Y and Z," etc. (any suitable QoS policy is contemplated). Clustered peers (e.g., peers 102, 104, and/or 106) may track the size and timing of some or all packets of a connection (e.g., connection 506) in order to compute and enforce such a policy accurately. In certain embodiments, peers may account for "burst" bandwidth where unallocated/unused bandwidth may be utilized by an application above its guaranteed allocation. In some embodiments, when asymmetric routing is occurring in a network, packets from the same connection associated with application X may reach different peers that belong to the same cluster. For example, first peer 102 has a QoS policy installed on it for application X and first peer 102 processed a connection associated with application X first in a cluster (e.g., as described regarding first peer 102 in FIG. 1A). In processing the connection of this example, first peer 102 may compute statistics (e.g., metrics and values related to QoS policies), for example, regarding connection 506 in FIG. 1B. In addition, other peers (e.g., second peer 104 and/or third peer 106) may compute their own QoS related statistics (e.g., metrics and values) if they encounter the same specific connection (e.g., connection 506) associated with application X. In such embodiments, the other peers (e.g., second peer 104 and/or third peer 106) may send their statistics as a type of control information to first peer 102. In this example, first peer 102 may then merge and incorporate these peer-computed statistics and other control information into its computations and enforce the QoS policy accordingly. Additionally, in certain embodiments any or all peers may obtain statistics from other peers that have encountered connection 506, such that any or all peers may participate in implementing the QoS policy. Therefore, in certain embodiments, QoS policies may be enforced accurately, even when a connection is distributed among multiple clustered peers.

In certain embodiments, a cluster of peered network devices, for example, cluster 100 (described further in FIG. 3A) containing peers 102, 104, and 106, may enforce rate control policies. In general, rate control is a method of informing a transmitter of network traffic to either slow down or speed up depending on the current processing capability of the receiver of the network traffic. In particular embodiments, enforcing rate control may involve modifying the protocol of network traffic, such as packets using TCP protocol. For example, a client workstation (e.g., client 502) may run Application A (e.g., a video stream) over a connection (e.g., connection 506). Multiple clustered peers (e.g., peers 102, 104, and 106) may be deployed between the client 502 and a host server 504 associated with application A (e.g., a streaming video server). In an example, first peer 102 has rate control policy information regarding client 502 and handles at least some of the packet traffic of connection 506 between client 502 and host server 504. In processing connection 506, first peer 102 may compute statistics (e.g., metrics and values related to rate control policies), for example, regarding connection 506, and may, in some embodiments, modify client 502's TCP packets to control how fast host server 504 will transmit a video stream over connection 506 to client 502. In addition, other peers (e.g., second peer 104 and/or third peer 106) may compute their own rate control related statistics (e.g., metrics and values) if they encounter the same specific connection (e.g., connection 506) associated with application A. In such embodiments, the other peers (e.g., second peer 104 and/or third peer 106) may send their computed statistics as a type of control information to first peer 102. In this example, first peer 102 may then merge and incorporate these peer-computed statistics and other control information into its computations and enforce the rate control policy accordingly. Additionally, in certain embodiments, any or all peers may obtain relevant statistics from other peers that have encountered connection 506, such that any or all peers may participate in implementing the rate control policy. Therefore, in certain embodiments, rate control policies may be enforced accurately, even when a connection is distributed among multiple clustered peers.

Figure 2A:
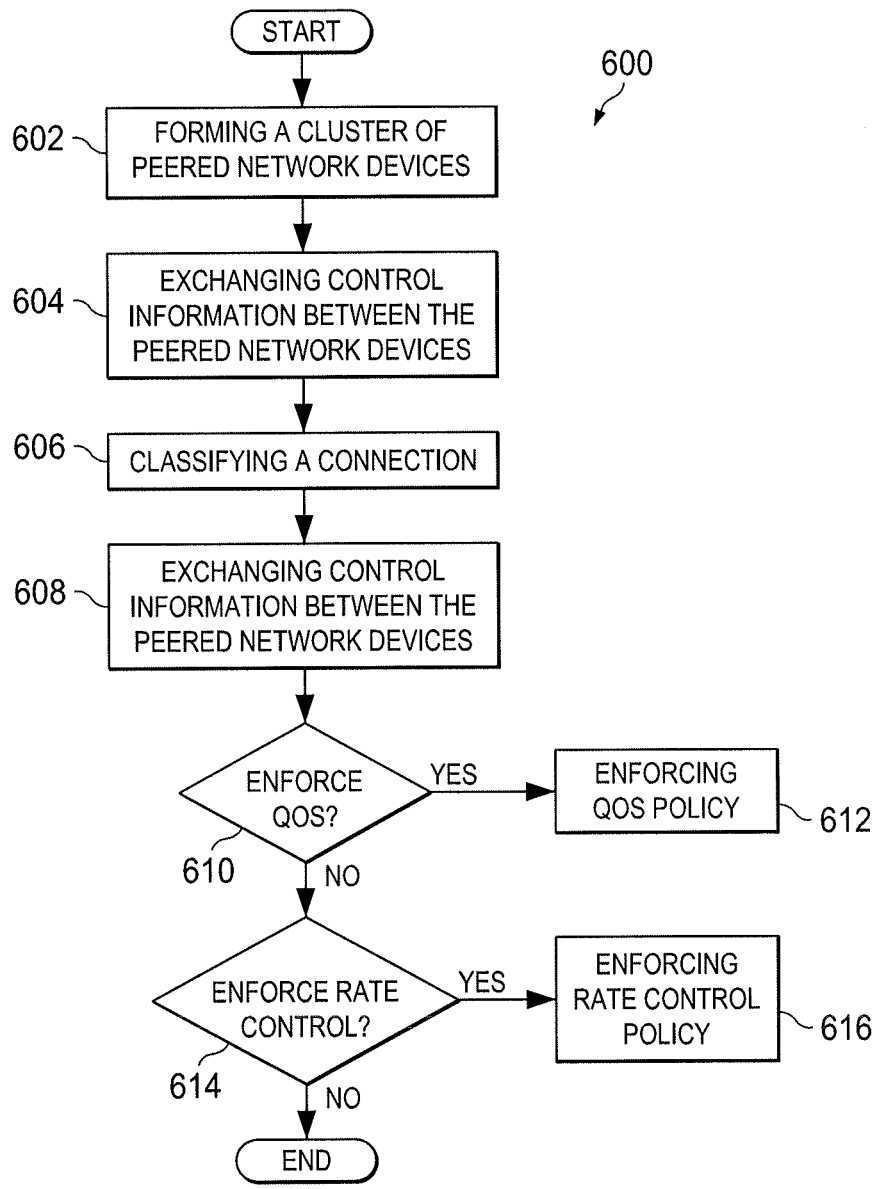
FIG. 2A illustrates a method, used by clustered peered network devices, such as the peered network devices of FIGS. 1A, 1B, 3A, 3B, 3C, and 3D, of forming a cluster of peered network devices, classifying a connection, and implementing certain policies regarding the connection, according to an example embodiment.

FIG. 2A illustrates a method 600, used by clustered peered network devices, such as the peered network devices described herein, of forming a cluster of peered network devices, classifying a connection, and implementing certain policies regarding the connection, according to an example embodiment.

Step 602 includes forming a cluster of peered network devices. For example, two or more peers may form a cluster as described regarding FIG. 3A. In particular embodiments, the cluster contains a plurality of control information connections (e.g., CICC 212) between the peered network devices of the cluster, wherein, for example, each control information connection exists between two peered network devices. In an example, each peer in the cluster has a control information connection with each other peer in the cluster, forming a full mesh. In some embodiments, the cluster will be operable to route data traffic (e.g., packets) of a particular connection (e.g., a network connection associated with an application) asymmetrically between and/or among some or all of the peers of the cluster, thus forming an example asymmetric routing environment. As one example, for a particular connection, a first peer (e.g., peer 102) may accept packets from a client destined for a host server, while a second peer (e.g., peer 104 or peer 106) may accept packets from the host server destined for the client. In another example, for a particular connection, some packets from a client destined for a host server may be routed to a first peer, while other packets from the client destined for the host server may be routed to a second (or third) peer. In another example, for a particular connection, some packets from a host server destined for a client may be routed to a first peer, while other packets from the host server destined for the client may be routed to a second peer. Other types of asymmetric routing are contemplated in this disclosure, which may include combinations of the above examples and/or other examples of asymmetric routing. While some of the examples above describe connections between clients and host servers, any other suitable connection could be routed through one or more clustered peer network devices according to this disclosure (e.g., connections between multiple clients, multiple servers, multiple other network devices, etc.).

Step 604 includes exchanging control information between the (now clustered) peer network devices. For example, two or more peers may exchange control information (e.g., class trees, updated control information, packet statistics, etc.) as described regarding FIGS. 3B, 3C, and 3D.

Step 606 includes classifying a connection. In some embodiments, a connection routed through the cluster is analyzed by one or more peers of the cluster to determine an application associated with the connection. For example, the connection may be classified as described regarding FIG. 1A. In some embodiments, a connection is classified by associating the application connection with an application, wherein a first peered network device associated with the cluster classifies the application connection based at least in part on sequential payload packets associated with the application connection forwarded by one or more other peered network devices associated with the cluster.

Step 608 includes exchanging control information between the clustered peer network devices. In some embodiments, step 608 may be the same as or similar to step 604. For example, two or more peers may exchange updated control information after classifying the connection. In some embodiments, two (or more) peers in the cluster may exchange control information over one (or more) of the plurality of control information connections (e.g., formed in step 602), e.g., between a first peered network device and a second peered network device associated with the cluster, wherein the control information contains information about the classification of the connection (e.g., as determined in step 606).

Step 610 includes determining whether to enforce a QoS policy on the connection. In particular embodiments, a determination of whether to enforce a QoS policy (and/or which QoS policy to enforce) is based, at least in part, on QoS policy information that may be stored locally on one or more clustered peers or non-locally but accessible to one or more clustered peers. In particular embodiments, a determination of whether to enforce a QoS policy (and/or which QoS policy to enforce) is based, at least in part, on the classification of the connection (e.g., as determined in step 606). In particular embodiments, a determination of whether to enforce a QoS policy (and/or which QoS policy to enforce) is based, at least in part, on packet statistics or other control information regarding the traffic of the connection. Step 610 may be determined based on any suitable information.

Step 612 includes enforcing a QoS policy. In certain embodiments, step 612 is initiated if, in step 610, it is determined that a QoS policy will be enforced. In certain embodiments, a specific QoS policy to be enforced will be determined in step 610, though in other embodiments, it will be determined in step 612, based on any suitable information (e.g., as described with regard to step 610). Example embodiments may implement a QoS policy as described regarding FIG. 1B. In an example embodiment regarding an asymmetrically routed connection, a first peered network device may gather first statistics (e.g., packet statistics) regarding packet traffic traveling to the first peered network device, and the packet traffic may be associated with a connection associated with a particular application. Furthermore, in this example embodiment, one or more other peered network devices may gather and send to the first peered network device second statistics (e.g., packet statistics) regarding packet traffic traveling to the one or more other peered network devices, and the packet traffic may be associated with the connection and the application. Still further, in this example embodiment, a QoS policy is enforced (by any suitable peered network device(s) in the cluster) based at least in part on the first and/or second statistics.

Step 614 includes determining whether to enforce a rate control policy on the connection. In particular embodiments, a determination of whether to enforce a rate control policy (and/or which rate control policy to enforce) is based, at least in part, on rate control policy information that may be stored locally on one or more clustered peers or non-locally but accessible to one or more clustered peers. In particular embodiments, a determination of whether to enforce a rate control policy (and/or which rate control policy to enforce) is based, at least in part, on the classification of the connection (e.g., as determined in step 606). In particular embodiments, a determination of whether to enforce a rate control policy (and/or which rate control policy to enforce) is based, at least in part, on packet statistics or other control information regarding the traffic of the connection. Step 614 may be determined based on any suitable information.

Step 616 includes enforcing a rate control policy. In certain embodiments, step 616 is initiated if, in step 614, it is determined that a rate control policy will be enforced. In certain embodiments, a specific rate control policy to be enforced will be determined in step 614, though in other embodiments, it will be determined in step 616, based on any suitable information (e.g., as described with regard to step 614). Example embodiments may implement a rate control policy as described regarding FIG. 1B. In an example embodiment regarding an asymmetrically routed connection, a first peered network device may gather first statistics (e.g., packet statistics) regarding packet traffic traveling to the first peered network device, and the packet traffic may be associated with a connection associated with a particular application. Furthermore, in this example embodiment, one or more other peered network devices may gather and send to the first peered network device second statistics (e.g., packet statistics) regarding packet traffic traveling to the one or more other peered network devices, and the packet traffic may be associated with the connection and the application. Still further, in this example embodiment, a rate control policy is enforced (by any suitable peered network device(s) in the cluster) based at least in part on the first and/or second statistics.

Although this disclosure describes and illustrates particular steps of the method of FIG. 2A as occurring in a particular order, this disclosure contemplates any steps of the method of FIG. 2A occurring in any order. An embodiment can repeat or omit one or more steps of the method of FIG. 2A. In an embodiment, some or all of the steps of the method of FIG. 2B can include or replace some or all of the steps of the method of FIG. 2A. In an embodiment, some or all of the steps of the method of FIG. 2A can include or replace some or all of the steps of the method of FIG. 2B. Moreover, although this disclosure describes and illustrates particular components carrying out particular steps of the method of FIG. 2A, this disclosure contemplates any combination of any components carrying out any steps of the method of FIG. 2A.

Figure 2B:
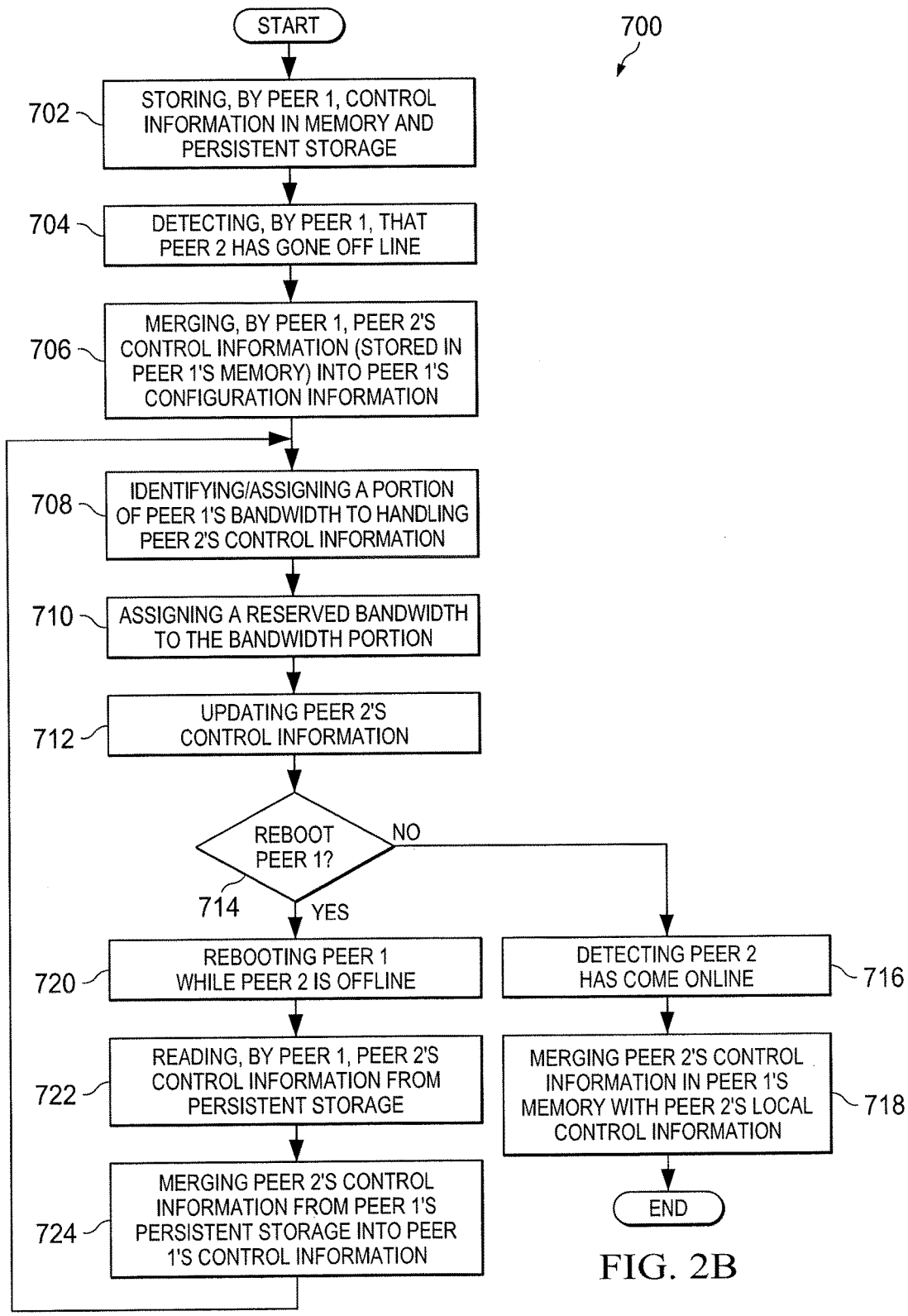
FIG. 2B illustrates a method 700, used by clustered peered network devices, such as the peered network devices of FIGS. 1A, 1B, 3A, 3B, 3C, and 3D, of maintaining control information in the event a clustered peer network device goes offline.

FIG. 2B illustrates a method 700, used by clustered peered network devices, such as the peered network devices described herein, of maintaining control information in the event a clustered peer network device goes offline.

Step 702 includes storing, by a first peer in a cluster (labeled "PEER 1" in FIG. 2B), control information (e.g., class (e.g., classification of an application), partition (e.g., a portion of a given bandwidth), policy information (e.g., QoS and.or rate control, etc.) in memory (e.g., local, or remote, memory of the first peer) and in persistent storage (e.g., as separate configuration file(s) on a disk, in an offsite database, in the cloud, and/or in any other suitable persistent storage location). In certain embodiments, the first peer may store its own local control information as well as one or more peer's control information (e.g., control information of a second peer in the cluster (labeled "PEER 2" in FIG. 2B)). For example, the first peer may store both its own control information and control information of the second peer, as described regarding FIGS. 3B, 3C, and 3D.

Step 704 includes detecting, by the first peer, that a second peer has gone offline. In example embodiments, the first peer may detect that the second peer has gone offline based on responses, or lack thereof, to keepalive messages, as discussed regarding FIG. 3B. Furthermore, any other suitable method of detecting that the second peer has gone offline may be used.

Step 706 includes merging, by the first peer, the control information of the second peer (stored in the first peer's memory) into the first peer's control information. For example, the first peer may copy (or otherwise merge) the second peer's class tree and store the second peer's class tree in a folder within the first peer's local class tree. In an example embodiment, the name of the folder may include the serial number and/or IP address of the offline peer (here, e.g., the second peer). In certain embodiments, the first peer stores the second peer's control information in any suitable location (with or without merging the control information of the first and second peers), including allowing the second peer's control information to remain where it is in the first peer's local memory.

Step 708 includes identifying and/or assigning a portion (partition) of the first peer's bandwidth to handling or implementing the second peer's control information (that is stored in the first peer's memory), e.g., the second peer's QoS policies. In certain embodiments, the first peer may assign or identify a portion (partition) of the first peer's bandwidth associated with the second peer's control information, e.g., the second peer's QoS policies, whether merged with the first peer's control information or not. For example, the first peer may assign a portion of bandwidth partition to updating, implementing, or otherwise affecting the folder (discussed in step 706) within the first peer's local class tree.

Step 710 includes assigning a reserved bandwidth to the bandwidth portion associated with the second peer's control information. In certain embodiments, assigning a reserved bandwidth may ensure that connections that were processed by the second peer before going offline will continue to be subject to, e.g., QoS or rate control policy enforcement. This may occur, in some embodiments, without affecting (or minimally affecting) policies being enforced on the first peer. In certain embodiments, assigning a reserved bandwidth may ensure that, while the second peer is offline, sufficient (or all) updated control information for the second peer is sent to and stored by the first peer, as described in step 712. In certain embodiments, the reserved bandwidth is set to a default of 10% of the available bandwidth per peer, and may be configurable (e.g., automatically or by a user or administrator of the cluster or a peer).

Step 712 includes updating the second peer's control information. In certain embodiments, while the second peer is offline, the first peer may gather (itself and/or with the assistance of other peers in the cluster) updated control information, such as packet statistics, regarding data traffic assigned to, routed through, or otherwise associated with the second peer. In some embodiments, after gathering updated control information associated with the second peer, the first peer may update its saved in-memory version of the second peer's control information. For example, after gathering updated control information associated with the second peer, the first peer may update the merged version of the second peer's class tree located in the folder within the first peer's class tree (as discussed in step 706). In certain embodiments, the first peer may update the second peer's stored information as described in FIG. 3D. In some embodiments, the first peer may update its version of the second peer's control information located in the first peer's memory and/or in the first peer's persistent storage. In an example embodiment, the first peer may update control information associated with the second peer, based at least in part on network traffic (1) associated with a connection formerly handled, at least in part, by the second peer and (2) occurring while the second peered network device is offline.

In certain embodiments, by updating the second peer's control information, the first peer (or any other peer, if the first peer has shared its and the second peer's control information with other peers) may be able to generate reports (e.g., run-time reports, traffic reports, etc.) that are comprehensive of all, or nearly all, of the control data associated with the cluster.

Step 714 includes a determination of whether the first peer reboots while the second peer is offline. If the first peer does not reboot while the second peer is offline, then method 700 proceeds to step 716. If, on the other hand, the first peer does reboot while the second peer is offline, then method 700 proceeds to step 720.

Step 716 includes detecting that the second peer has come online. In certain embodiments, the first peer may detect that the second peer has come back online after being offline for a period of time. In particular embodiments, another peer in the cluster detects that the second peer has come back online and informs the first peer, thus allowing the first peer to detect that the second peer has come online. Any peer may detect that the second peer has come back online in any suitable way. For example, when the second peer comes back online, it may send a message to one or more other peers in the cluster that it is online. As another example, the second peer may respond to keepalive messages sent by one or more other peers.

Step 718 includes merging the version of the second peer's control information stored in the first peer's memory with the second peer's local class tree. In certain embodiments, the first peer may have updated the version of the second peers' control information while the second peer was offline. In such embodiments, by merging this updated version with the second peer's local class tree (e.g., stored locally on, or remotely accessible by, the second peer), the second peer may be able to resume routing traffic using up-to-date configuration data. Thus, in certain embodiments, method 700 may allow a peer that goes offline to more quickly recover and resume its duties once the peer comes back online.

In addition, when the second peer comes back online, the first peer may separate the second peer's control information from within the first peer's control information and re-save it in memory and/or in persistent storage as a copy of the second peer's control information. In certain embodiments, the first peer's memory and/or persistent storage will be in a similar state (possibly with updated control information) as it was before the second peer went offline. Then, the first peer may update the second peer's control information as described in FIG. 3C.

Step 720 includes rebooting the first peer while the second peer is offline. In certain embodiments, if the first peer reboots while the second peer is offline, then the first peer risks missing certain updates to its local control information and/or its saved control information associated with other peer(s) in the cluster, particularly control information stored in local memory on the first peer. Step 720 ends once the first peer has rebooted and is back online.

Step 722 includes reading, by the first peer, the second peer's control information from the persistent storage of the first peer. In certain embodiments, if the first peer reboots, it may lose some or all of the control information stored in local memory (e.g., control information associated with other peers, such as the second peer). In some embodiments, if the first peer reboots, it may lose some or all of its local control information and may read its own local control information from its persistent storage. In particular embodiments, some or all of the control information lost from local memory during a reboot may remain in the first peer's persistent storage. Thus, in an example embodiment, once the first peer reboots it may read some or all of the lost control information (whether local or associated with a peer) from its persistent storage.

Step 724 includes merging some or all of the control information that the first peer read from persistent storage in step 722 into the first peer's control information. In certain embodiments, the control information from the first peer's persistent storage is merged into the first peer's control information, as described, for example, in step 706. In some embodiments, the first peer may merge some or all of its local control information saved in its persistent storage into its local control information saved in its local memory (or other accessible memory source). Thus, in certain embodiments, the first peer may be able to recover from a reboot without losing a large amount (or any) control information (whether local or associated with a peer). Once step 724 is complete, method 700 continues at, for example, step 708, though method 700 may continue at any suitable step.

Although this disclosure describes and illustrates particular steps of the method of FIG. 2B as occurring in a particular order, this disclosure contemplates any steps of the method of FIG. 2B occurring in any order. An embodiment can repeat or omit one or more steps of the method of FIG. 2B. In an embodiment, some or all of the steps of the method of FIG. 2A can include or replace some or all of the steps of the method of FIG. 2B. In an embodiment, some or all of the steps of the method of FIG. 2B can include or replace some or all of the steps of the method of FIG. 2A. Moreover, although this disclosure describes and illustrates particular components carrying out particular steps of the method of FIG. 2B, this disclosure contemplates any combination of any components carrying out any steps of the method of FIG. 2B.

FIG. 3A illustrates a cluster 100 of peered network devices, including initial connections between peers, according to an example embodiment. In certain embodiments, cluster 100 contains multiple peered network devices, such as a first peer 102, a second peer 104, and a third peer 106. Peered network devices in cluster 100 may be on the same network or on different networks, such as network 108 and network 110. The network peers of cluster 100 may also be connected to each other, for example, via initial connections 112, 114, and 116.

In general, the network devices of cluster 100 manage traffic between endpoints, such as between client devices and host servers (or other sources of data, e.g., databases, other clients, networking devices outside cluster 100, etc.). The network devices of cluster 100 may, for example, classify traffic based on application type, implement rate control policies (e.g., based on application type), and/or quality of service policies (e.g., based on application type). In certain embodiments, the network devices of cluster 100 support and allow for asymmetrically routed network connections between client devices and host servers and/or manage network traffic in such asymmetrically routed network cluster environments. In addition, in particular embodiments, the network devices of cluster 100 (e.g., peers 102, 104, and 106) may allow for or provide other network services, for example, internet or database connectivity, firewall or other security services, individual and/or group device access and connection management (e.g., implementing policies regarding different service, connection, or access levels for devices associated with different employees or groups), or any other suitable purpose.

Peers 102, 104, and 106 are individual network devices in clusters, such as cluster 100. Peers, such as peers 102, 104, and 106, may, in particular embodiments, be positioned locally in between one or more client devices and one or more host servers (including, for example, between client devices and a wide area network, such as the Internet). In other embodiments, peers 102, 104, and 106 may be positioned in a wide area network, a private network, and/or the cloud, etc. In certain embodiments, peers may be servers, gateways, computers, session border controllers, and/or any suitable network device that perform in ways described in this disclosure. While FIG. 3A shows cluster 100 as having three peers, cluster 100 may have any suitable number of peers.

In certain embodiments, peers 102, 104, and 106 may contain a data storage and a processor communicatively coupled to the data storage, wherein the data storage and/or the processor are operable to perform any of the functions of this disclosure.

Peers in a cluster, such as peers 102, 104, and 106, maintain a persistent connection (e.g., a TCP connection) with each other to exchange information, such as control information or other data or information, in some embodiments. Examples of such connections are shown in FIG. 3A as initial connections 112, 114, and 116 between peers. FIG. 3B describes such connections, according to certain embodiments. In an example embodiment, between any two peers in a cluster (e.g., peer 102 and peer 104), the peer with the lower IP address initiates the initial connection (e.g., a TCP connection). The peer with the lower IP address may be referred to as the "dominant" peer. For example, peer 102 has a lower IP address than peer 104 and thus initiates initial connection 112 with peer 104. Likewise, peer 102 has a lower IP address than peer 106 and thus initiates initial connection 114 with peer 106. Similarly, peer 104 has a lower IP address than peer 106 and thus initiates initial connection 116 with peer 106. In some embodiments, if a peer with a higher IP address initiates an initial connection, the connection is closed and the peers with a lower IP address reinitiates the initial connection. In certain embodiments, each of the peers in a cluster is connected to each of the other peers in a cluster, forming a full mesh. Other embodiments may have other configurations, which may or may not include clusters with peers in full mesh configurations.

Cluster 100 (and its component peers) can recover when a peer in the cluster goes down, which may be referred to as the "downed peer," in some embodiments. In an example embodiment, when a peer (such as peer 102, 104, or 106) goes down in cluster 100 and then reboots, the downed peer sends out a new initial connection to each peer in the cluster. In such example embodiments, if a peer accepts a new initial connection from the downed peer and the downed peer is the dominant peer, then the old connection between the two peers is closed, and the peers start communicating using the new initial connection. For instance, if second peer 104 goes down, reboots, and sends a new initial connection to third peer 106, then connection 116 (the old connection) is closed and second peer 104 and third peer 106 start communicating using the new initial connection. Alternatively, in such example embodiments, if a peer accepts a new initial connection from the downed peer and the downed peer is not the dominant peer, the new initial connection is used to indicate that the downed peer has rebooted. In this case, both the old connection and the new initial connection are closed, and then the dominant peer initiates another new initial connection with the downed peer. For instance, if peer 104 goes down, reboots, and sends a new initial connection to first peer 102, then the new initial connection is used to indicate that second peer 104 rebooted. Afterwards, both connection 112 (the old connection) and the new initial connection are closed, and then first peer 102 initiates another new initial connection with peer 104. The embodiments described above are examples, and a cluster 100 of network devices may operate the same as, differently than, or in accordance with portions of the described embodiments.

In the example of FIG. 3A, first peer 102 and second peer 104 are on the same network, such as a network 108, and third peer 106 is on a different network, such as network 110. A network, such as networks 108 and 110, may be any suitable type of network, for example, an IP network, and networks 108 and 110 may be the same type or different types of networks. In certain embodiments, networks 108 and/or 110 may be local area networks, which may be connected to a wide area network (WAN). In other embodiments, networks 108 and/or 110 may be cloud-based and/or wide area networks. Peers in a cluster (such as cluster 100), whether on the same network or on different networks, may communicate with each other even if individual peers are multiple hops away (e.g., are connected through one or more other routing devices). While the example of FIG. 3A shows peers on two different networks in a particular configuration, other embodiments may have peers in other configurations, which may include all of the peers of a cluster on one network, or, alternatively, distributed in any way across any other suitable number of networks.

In particular embodiments, cluster 100 of FIG. 3A may facilitate the implementation of clustering of multiple peered network devices, each pair of peers being one or more routing hops away from each other. Such clusters may, in certain embodiments, enable the use of various features, such as intelligent application-based load balancing (e.g., rate control), real-time infrastructure traffic monitoring and reporting, dynamic policy provisioning (e.g., QoS policy implementation), and statistics and information sharing, such as sharing class trees, among and between peers.

FIG. 3B illustrates a pair of peers 200, such as peers 102 and 104 of FIG. 3A, connecting with each other, establishing cluster membership, and exchanging control information, according to an example embodiment. More specifically, FIG. 3B shows peers 102 and 104 starting from an unconnected state 206 and joining a cluster to end at a joined state 210. Once the peers (e.g., peers 102 and 104) are connected and joined to a cluster, the peers establish a control information communication channel (CICC) 212 to send and receive control information (e.g., class trees 202 and 204) and a payload information communication channel (PICC) 214 to send and receive data traffic (e.g., packet payloads).

In the example of FIG. 3B, unconnected state 206 shows first peer 102 and second peer 104 as independent peers that connect via initial connection 112. For example, first peer 102, as the dominant peer having the lower IP address, establishes initial connection 112 with peer 104 as described above regarding FIG. 3A.

In particular embodiments, each peer has a class tree (e.g., class trees 202 or 204) associated with that peer. In general, a class tree contains information regarding data traffic of connections passing through and/or handled by its associated peer, for example, application classification information that identifies the application associated with particular data traffic and connections, number and types of applications and connections passing through the associated peer, etc. In the example of FIG. 3B, peer 102 is associated with class tree 202, and peer 104 is associated with class tree 204. While the class trees in the example of FIG. 3B are represented as having a tree structure having certain folders, some embodiments have other structures and/or folders.

Once an initial connection (e.g., initial connection 112) between peers is established, the peers send a join message 208 to establish cluster membership, in certain embodiments. Join message 208 may be treated as a type of control information. In some embodiments, a cluster is initially formed by a pair of peers (e.g., pair of peers 200) connecting and establishing a new cluster membership with each other. In certain embodiments, a pair of peers connect with each other and then connect with an existing cluster. In still other embodiments, a pair of peers contains one peer that is part of a cluster and another peer that is not part of a cluster. In such embodiments, once the pair of peers connect with each other, the pair of peers send join message 208 to establish the cluster membership of the peer that was previously not part of the cluster. In certain embodiments, one or both peers in a peer pair send join message 208.

Once a cluster membership is formed, pair of peers 200 (e.g., peers 102 and 104) exchange, send, and/or receive control information, in some embodiments control information may include: class tree information (e.g., class trees, class additions or deletions, matching rule additions or deletions, bandwidth partition additions or deletions, and policy additions or deletions), cluster maintenance messages (e.g., join messages and keepalive messages), statistics (e.g., traffic and packet statistics), and other control information. Particularly, in certain embodiments, peer pairs, such as peers 102 and 104 establish a CICC, such as CICC 212, and exchange control information over CICC 212. In some embodiments, initial connections 112, 114, and/or 116 may be/function as CICC connections, and CICC connections may form as described in FIG. 3A regarding initial connections. For example, peer 102 and 104 may form CICC 212 and exchange class trees and other class tree information (or other control information). Thus, in certain embodiments, each peer in a peer pair stores both its own local class tree (for peer 102, it stores its associated local class tree 202) as well as its peer's class tree (peer class tree 204 associated with peer 104). For a cluster having more than two peers (e.g., cluster 100), repeating the process of exchanging control information between different peer pairs in the cluster may result, in certain embodiments, in each peer of the cluster storing and/or accessing class tree and other control information associated with each of the other peers of the cluster. For example, in FIG. 3A, first peer 102 may store or otherwise have access to its local class tree (e.g., class tree 204), as well as the class trees associated with second peer 104 and third peer 106. Likewise, peers 104 and 106 may each store their own local class trees, as well as the class trees of the other peers of cluster 100. Moreover, in particular embodiments, each peer in a cluster may store or have access to some or all of its local control information, as well as some or all of the control information of each of the other peers in the cluster. In certain embodiments, a peer, such as peer 102, may store its local class tree (and other control information) and/or its peer's class tree (and other control information) in local memory on peer 102, as a separate configuration file on a disk, in an offsite database, in the cloud, and/or in any other suitable storage location. In an example embodiment, a peer stores its peer's control information (e.g., the peer's class tree) in both local memory and in a configuration file on a disk to ensure redundancy of the control information in the event, e.g., one or more peers go down.

Once a cluster membership is formed, pair of peers 200 (e.g., peers 102 and 104) may exchange, send, and/or receive payload information, such as data traffic (e.g., packet payloads). Particularly, in certain embodiments, peer pairs, such as peers 102 and 104 establish a PICC, such as PICC 214, and exchange payload information over PICC 214. Thus, peer 102 may send to (or receive from) other peers of cluster 100 certain data traffic, such as packet payloads associated with a certain connection and/or application. In particular embodiments, PICC 214 uses ETHER-IN-IP protocol, which may include embedded data regarding the source device on which a particular packet was received. Forwarding data traffic to peers, including any embedded data, e.g., via PICCs, may be used during connection classification, which is described further in FIGS. 1A and 1B. Packet payloads forwarded between peers may have certain size guidelines or limitations (e.g., individual packet payloads may be limited to 500 bytes).

Once a cluster is formed, peers may send keepalive messages (e.g., over CICC 212) to determine whether a peer is online or offline. A cluster may have various settings for determining when to consider a peer offline. For example, first peer 102 in a cluster may be set up to send second peer 104 a keepalive message every 5 seconds that peer 104 appears inactive to peer 102. If peer 102 does not receive a response to, e.g., three consecutive keepalive messages, then peer 102 may consider peer 104 to be offline and may inform any other peers in the cluster. In some embodiments, multiple (or all) peers may send multiple other (or all other) peers keepalive messages in a similar or different manner.

In addition, once control information is shared between peers of a network after initial connection, a cluster (e.g., cluster 100) may need to update control information stored on each peer based on the local data traffic each other peer in the cluster is receiving. FIGS. 3C and 3D describe an example embodiment of updating such control information.

FIGS. 3C and 3D illustrate clustered peered network devices of FIGS. 3A and 3B updating control information in response to receiving local data traffic, according to an example embodiment. More specifically, FIG. 3C illustrates updating a peer's (e.g., first peer 102) store of local control information, such as class tree 202, in response to receiving local data traffic associated with the peer, such as a packet 302, according to an example embodiment.

When data traffic, such as packet 302, arrives locally at peer 102, peer 102 collects, stores, and/or processes information regarding packet 302, in some embodiments. For example, peer 102 may collect information about the payload of packet 302, a sender of packet 302, a recipient of packet 302, an identification of an application associated with packet 302, the size of packet 302, the total size of a file composed partly of packet 302, information regarding the protocol used in packet 302, information from the header of packet 302, or any other information regarding packet 302. In some embodiments, once peer 102 collects information regarding packet 302, peer 102 stores and/or processes some or all of the packet information as local control information (e.g., packet statistics or other control information), and uses it to update its stores of local control information (which may or may not be stored locally, as discussed in relation to FIG. 3B). For example, peer 102 may use some or all of the information it collects regarding packet 302 to update peer 102's local class tree, class tree 202. In the example of FIG. 3C, peer 102 obtains information from packet 302, determines packet 302 is associated with a particular audio/video application, and updates the portion of the class tree associated with the audio/video application (shown in FIG. 3B as the circled portion of local class tree 202). In other embodiments, peer 102 may use some or all of the information it collects regarding packet 302 to update other control information (whether local or otherwise).

Packet 302 may exist in an IP protocol format (as an IP packet), though other protocols are contemplated, in some embodiments and peer 102 may update its stores of local control information in batches. For example, peer 102 may accumulate local control information and then update local class tree 202 every 50 milliseconds (ms), 100 ms, 200 ms, or any other suitable timeframe. As another example, peer 102 may update local control information each time it collects more than a certain size of one or more types of control information, such as 50 bytes, 100 bytes, 250 bytes, 500 bytes, or any other suitable size. As still another example, peer 102 may update local control information in real time or near-real time, rather than in batches. Additionally, while FIG. 3C describes one peer in a cluster, none, some, or all of the peers in a cluster, such as cluster 100 in FIG. 3A, may update local control information based on received packets, for example, as described regarding FIG. 3C.

FIG. 3D illustrates updating a first peer's (e.g., first peer 102) store of a second peer's (e.g., second peer 104) control information (e.g., using packet statistics to update peer class tree 204) via a communication channel (e.g., CICC 212) in response to the second peer receiving data traffic, such as a packet 304, according to an example embodiment. In certain embodiments, statistics (or other control information) regarding local data traffic at a peer are sent to other peers in the cluster to ensure that each peer's stored control information regarding other peers is up to date.

When data traffic, such as packet 304, arrives locally at second peer 104, second peer 104 collects, stores, and/or processes information regarding packet 304 as local control information (e.g., packet statistics or other control information), for example, as described above regarding FIG. 3A. In addition, second peer 104 may, in some embodiments, send some or all of the control information collected regarding packet 304 to first peer 102 (e.g., packet statistics or other control information). For example, second peer 104 may collect packet statistics and other updated control information for its class tree 204 from packet 304 and then send the updated control information via a connection, such as CICC 212, to another peer, such as first peer 102. In certain embodiments, second peer 104 may or may not make certain determinations regarding the information collected from packet 304 (such as determining an application associated with packet 304) before sending updated control information to first peer 102. In some embodiments, once first peer 102 receives updated control information from second peer 104 regarding packet 304, first peer 102 uses some or all of the control information to update its stores of peer control information associated with second peer 104 (which may or may not be stored locally, as discussed in relation to FIG. 3B). For example, first peer 102 may use some or all of the control information it receives from second peer 104 regarding packet 304 to update first peer's 102 peer class tree 204 (associated with second peer 104). In the example embodiment of FIG. 3D, upon first peer 102 receiving control information regarding packet 304 from second peer 104 over CICC 212, first peer 102 determines packet 304 is associated with a particular browser application (or is sent control information to this effect from second peer 104), and then first peer 102 updates the portion of peer class tree 204 associated with the browser application (shown in FIG. 3B as the circled portion of peer class tree 204). In other embodiments, first peer 102 may use some or all of the information it receives regarding packet 304 to update other control information (whether local or otherwise).

Packet 304 may exist in an IP protocol format (as an IP packet), though other protocols are contemplated. In particular embodiments, second peer 104 may send updated control information to other peers (e.g., first peer 102), e.g., as described above, in batches. For example, second peer 104 may accumulate updated control information and then send it out every 50 milliseconds (ms), 100 ms, 200 ms, or any other suitable timeframe. As another example, second peer 104 may send updated control information each time it collects more than a certain size of one or more types or categories of control information, such as 50 bytes, 100 bytes, 250 bytes, 500 bytes, or any other suitable size of control information. As still another example, second peer 104 may send updated control information in real time or near-real time, rather than in batches.

Likewise, a peer receiving updated control information, such as first peer 102 in FIG. 3D, from another peer may update its peer control information (e.g., peer class tree 204) is any manner, for example, in the various manners described in FIG. 3C regarding updating local control information (batching, in real time, etc.). Additionally, while FIG. 3D describes one peer in a cluster updating one other peer in the cluster, in some embodiments some or all of the peers in a cluster, such as cluster 100 in FIG. 3A, may update control information associated with other peers in the cluster, for example, as described with regard to FIG. 3D.

The exchange of control information between peers may ensure that each peer in a cluster has all, or nearly all, of the control information of all the peers in the cluster, in some embodiments. Thus, in certain embodiments, any peer in a cluster may be able to generate a report (e.g., a run-time report, a traffic report, etc.) that is comprehensive of the entire cluster, or a portion thereof. Similarly, a user may access a user interface associated with any single peer and be able to access all, or nearly all, of the control information associated with the cluster.

A single peer in a cluster may maintain multiple class trees (and/or other control information) associated with a number of other peers in the cluster. Certain data structures, such as those described in FIG. 3E, may be useful in certain embodiments to allow peers to efficiently update and keep track of multiple class trees associated with multiple other peers.

Figure 3E:
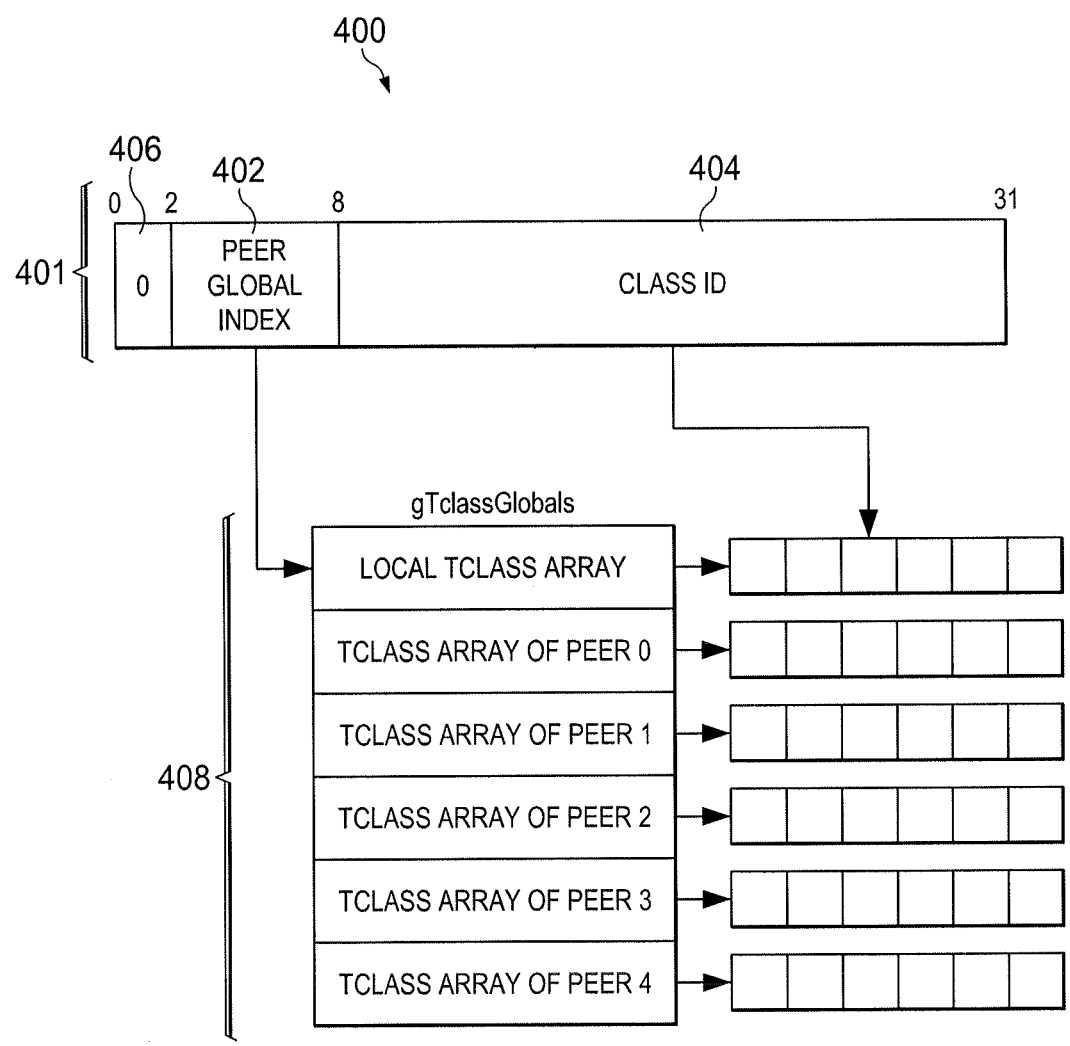
FIG. 3E illustrates example data structures, including an example class ID data structure and a traffic class global data structure, according to an example embodiment.

FIG. 3E illustrates example data structures 400, including an example class ID data structure 401 and a traffic class global data structure 408, according to an example embodiment. In certain embodiments data structures 400 can be used, for example, to support the use of multiple class trees by peer network devices in a clustered environment, for example in FIGS. 1A, 1B, 3B, 3C, 3D. In certain embodiments, class ID data structure 401 contains multiple data fields, such as a peer global index 402, a class ID 404, and a reserve field 406. In certain embodiments, some or all of class ID data structure 401 can be compiled into a traffic class (Tclass) global data structure 408.

In general, class ID data structure 401 provides a data structure that allows or facilitates peers to distinguish, access, convey, maintain, and update multiple class trees. For example, the peers in FIG. 3B may exchange class tree information so that one peer has both its own class tree and a class tree associated with another peer (or, e.g., two, three, four, or more other peers). As another example, the peers of FIG. 3 may send and receive statistics updates to and from one another that can include class tree statistics and updates. Class ID data structure 401, in certain embodiments, provides a data structure to allow peers to keep track of multiple class trees stored on each peer. In the example shown in FIG. 3E, the size of class ID data structure 401 is 32 bits (bits 0 to 31), though class ID data structure 401 could be any suitable size.

In the example of FIG. 3E, class ID data structure 401 contains peer global index 402. In general, peer global index 402 identifies one or more peers associated with one or more particular class trees, and thus may serve as an index of peer IDs. Peer global index 402 may also serve as an index to identify a traffic class (Tclass) associated with a particular class tree. For example, the peer global index may be 0 for local traffic class (the traffic class associated with local traffic at a particular peer), which may help ensure backward compatibility with protocols that use a class ID (such as class ID 404) but no peer global index. In example embodiments, for any different peers in a cluster, each peer may have a different peer global index 402. For example, peers 0 through 4 in a network cluster may have peer global index values of 1 through 5 respectively, which may represent the Tclass associated with each peer. In certain embodiments, peer global index 402 may be an array. In the example of FIG. 3E, peer global index 402 is 6 bits long (bits 2 through 7), though peer global index 402 may be any suitable size.

In the example of FIG. 3E, class ID data structure 401 contains class ID 404. In general, class ID 404 identifies one or more class trees associated with one or more peers, and thus may serve as an index of class trees. Class ID 404 may also serve as an index, which, in conjunction with peer global index 402, may identify a class tree associated with a particular traffic class (Tclass) and/or peer in a network cluster. In certain embodiments, peer class ID 404 may be an array. In the example of FIG. 3E, class ID 404 is 24 bits long (bits 8 through 31), though class ID 404 may be any suitable size.

In the example of FIG. 3E, class ID data structure 401 contains reserve field 406. In general, reserve field 406 is reserved for uses in class ID data structure 401 other than peer global index 402 or class ID 404. In the example of FIG. 3E, reserve field 406 is 2 bits long (bits 0 through 1), though reserve field 406 may be any suitable size.

Multiple peer global index 402 values (each of which may be in the form of an array) are compiled into Tclass global data structure 408 (shown as gTclassGlobals in FIG. 3E), in some embodiments, which may contain a peer global index 402 for each peer in a network cluster. Furthermore, in certain embodiments, Tclass global data structure 408 may also contain multiple class IDs 404 that correspond to each of the peer global index 402 values in Tclass global data structure 408. Thus, for example, Tclass global data structure 408 may contain multiple arrays of peer global index 402 values, where each array may identify a Tclass for a particular peer in a network cluster, as well as multiple class IDs 404 associated with the peer global index 402 values. By associating multiple class IDs 404 with the multiple peer global index 402 values, Tclass global data structure 408 associates the traffic class of each peer to its corresponding class tree. In certain embodiments, this may allow a peer in a network cluster to more quickly distinguish, access, convey, maintain, and update a particular class tree or class ID data structure 401, for example, by using array indices as shown in FIG. 3E.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method, comprising:
    forming a cluster of peered network devices, comprising:
        a plurality of three or more peered network devices; and
        a plurality of control information connections between pairs of the peered network devices;
    classifying a connection by associating the connection with an application, wherein a first peered network device of the plurality of three or more peered network devices that is associated with the cluster classifies the connection based at least in part on sequential payload packets associated with the connection, at least some of which are received by the first peered network device from one or more other peered network devices associated with the cluster;
    sending control information over one of the plurality of control information connections between the first peered network device and a second peered network device, wherein the second peered network device obtains control information from the first peered network device;
    assigning, by the first peered network device, a portion of a bandwidth of the first peered network device to implementing the control information of the second peered network device; and
    implementing the control information of the second peered network device over the assigned portion of the bandwidth of the first peered network device.

2. The method of claim 1, further comprising:
    enforcing a quality of service policy in an asymmetrically routed cluster environment, wherein:
        the quality of service policy is enforced based at least in part on statistics regarding packet traffic traveling to multiple peered network devices of the plurality of peered network devices that are associated with the cluster; and
        the packet traffic is associated with the connection and the application.

3. The method of claim 2, further comprising:
    enforcing a rate control policy in an asymmetrically routed cluster environment, wherein:
        the rate control policy is enforced based at least in part on statistics regarding packet traffic traveling to multiple peered network devices of the plurality of three or more peered network devices that are associated with the cluster; and
        the packet traffic is associated with the connection and the application.

4. The method of claim 2, further comprising:
    sending control information over one of the plurality of control information connections between the second peered network device and a third peered network device of the plurality of three or more peered network devices that is associated with the cluster, wherein the third peered network device obtains control information from the second peered network device; and sending updated control information over one of the plurality of control information connections between the first peered network device and the second peered network device, wherein:

the updated control information contains information associated with network traffic handled by the first peered network device; and the second peered network device uses the updated control information to update a class tree associated with the first peered network device, wherein the class tree is maintained by the second peered network device.

5. The method of claim 2, wherein the control information sent between the first peered network device and the second peered network device comprises a data structure comprising:

a first field that identifies the first peered network device; and a second field that identifies a class tree associated with the first peered network device.

6. The method of claim 2, wherein classifying a connection further comprises:

receiving, by the first peered network device, a first message indicating that the connection is to be established;

sending, by the first peered network device, a second message to one or more other peered network devices of the plurality of three or more peered network devices that is associated with the cluster indicating that the first peered network device seeks to classify the connection;

sending, by the first peered network device, a third message to the one or more other peered network devices indicating that the classification of the connection is complete.

7. The method of claim 2, further comprising:

storing, by the first peered network device, control information associated with the second peered network device;

detecting, by the first peered network device, that the second peered network device has gone offline;

updating, by the first peered network device, the control information associated with the second peered network device, based at least in part on network traffic:
associated with a second connection formerly handled, at least in part, by the second peered network device; and
occurring while the second peered network device is offline;

detecting, by the first peered network device, that the second peered network device has come online; and sending, by the first peered network device to the second peered network device, the updated control information associated with the second peered network device.

8. The method of claim 2, wherein the assigning, by the first peered network device, of the portion of the bandwidth of the first peered network device further comprises:

assigning the portion of bandwidth of the first peered network device to updating or implementing a folder within a local class tree of the first peered network device.

9. A system comprising a cluster of peered network devices, comprising:

a plurality of three or more peered network devices, each peered network device comprising:

a data storage; and a processor communicatively coupled to the data storage;

wherein a plurality of control information connections exist between pairs of the peered network devices; and wherein one or more of the processors associated with one or more of the plurality of three or more peered network devices is operable to:

classify a connection by associating the connection with an application, wherein a first peered network device of the plurality of three or more peered network devices that is associated with the cluster classifies the connection based at least in part on sequential payload packets associated with the connection, at least some of which are received by the first peered network device from one or more other peered network devices associated with the cluster;

send control information over one of the plurality of control information connections between the first peered network device and a second peered network device, wherein the second peered network device obtains control information from the first peered network device; and assign, by the first peered network device, a portion of a bandwidth of the first peered network device to implementing the control information of the second peered network device; and implement the control information of the second peered network device over the assigned portion of the bandwidth of the first peered network device.

10. The system of claim 9, wherein the processor is further operable to classify the connection in an asymmetrically routed cluster environment.

11. The system of claim 9, wherein the one or more of the processors associated with one or more of the plurality of three or more peered network devices is further operable to:

enforce a quality of service policy in an asymmetrically routed cluster environment, wherein:

the quality of service policy is enforced based at least in part on statistics regarding packet traffic traveling to multiple peered network devices of the plurality of three or more peered network devices that are associated with the cluster; and the packet traffic is associated with the connection and the application.

12. The system of claim 9, wherein the one or more of the processors associated with one or more of the plurality of three or more peered network devices is further operable to:

enforce a rate control policy in an asymmetrically routed cluster environment, wherein:

the rate control policy is enforced based at least in part on statistics regarding packet traffic traveling to multiple peered network devices of the plurality of three or more peered network devices that are associated with the cluster; and the packet traffic is associated with the connection and the application.

13. The system of claim 9, wherein the one or more of the processors associated with one or more of the plurality of three or more peered network devices is further operable to:

send control information over one of the plurality of control information connections between the second peered network device and a third peered network device of the plurality of three or more peered network devices that is associated with the cluster, wherein the third peered network device obtains control information from the second peered network device; and send updated control information over one of the plurality of control information connections between the first peered network device and the second peered network device, wherein:

the updated control information contains information associated with network traffic handled by the first peered network device; and the second peered network device uses the updated control information to update a class tree associated with the first peered network device, wherein the class tree is maintained by the second peered network device.

14. The system of claim 9, wherein the control information sent between the first peered network device and the second peered network device comprises a data structure comprising:

a first field that identifies the first peered network device; and a second field that identifies a class tree associated with the first peered network device.

15. The system of claim 9, wherein the one or more of the processors associated with one or more of the plurality of three or more peered network devices is further operable to:

receive, by the first peered network device, a first message indicating that the connection is to be established;

send, by the first peered network device, a second message to one or more other peered network devices of the plurality of three or more peered network devices that is associated with the cluster indicating that the first peered network device seeks to classify the connection;

send, by the first peered network device, a third message to the one or more other peered network devices indicating that the classification of the connection is complete.

16. The system of claim 9, wherein the one or more of the processors associated with one or more of the plurality of three or more peered network devices is further operable to:

store, by the first peered network device, control information associated with the second peered network device;

detect, by the first peered network device, that the second peered network device has gone offline;

update, by the first peered network device, the control information associated with the second peered network device, based at least in part on network traffic:

associated with a second connection formerly handled, at least in part, by the second peered network device; and occurring while the second peered network device is offline;

detect, by the first peered network device, that the second peered network device has come online; and send, by the first peered network device to the second peered network device, the updated control information associated with the second peered network device.

17. One or more computer-readable non-transitory storage media in one or more computing system, the media embodying logic that is operable when executed to perform operations, comprising:

forming a cluster of peered network devices, comprising:
a plurality of three or more peered network devices; and
a plurality of control information connections between pairs of the peered network devices;

classifying a connection by associating the connection with an application, wherein a first peered network device of the plurality of three or more peered network devices that is associated with the cluster classifies the connection based at least in part on sequential payload packets associated with the connection, at least some of which are received by the first peered network device from one or more other peered network devices associated with the cluster;

sending control information over one of the plurality of control information connections between the first peered network device and a second peered network device, wherein the second peered network device obtains control information from the first peered network device; and assigning, by the first peered network device, a portion of a bandwidth of the first peered network device to implementing the control information of the second peered network device; and implementing the control information of the second peered network device over the assigned portion of the bandwidth of the first peered network device.

18. The computer-readable non-transitory storage media of claim 17, wherein classifying the connection occurs in an asymmetrically routed cluster environment.

19. The computer-readable non-transitory storage media of claim 17, further comprising:

enforcing a quality of service policy in an asymmetrically routed cluster environment, wherein:

the quality of service policy is enforced based at least in part on statistics regarding packet traffic traveling to multiple peered network devices of the plurality of three or more peered network devices that are associated with the cluster; and the packet traffic is associated with the connection and the application.

20. The computer-readable non-transitory storage media of claim 17, further comprising:

enforcing a rate control policy in an asymmetrically routed cluster environment, wherein:

the rate control policy is enforced based at least in part on statistics regarding packet traffic traveling to multiple peered network devices of the plurality of three or more peered network devices that are associated with the cluster; and the packet traffic is associated with the connection and the application.

21. The computer-readable non-transitory storage media of claim 17, further comprising:

sending control information over one of the plurality of control information connections between the second peered network device and a third peered network device of the plurality of three or more peered network devices that is associated with the cluster, wherein the third peered network device obtains control information from the second peered network device; and sending updated control information over one of the plurality of control information connections between the first peered network device and the second peered network device, wherein:

the updated control information contains information associated with network traffic handled by the first peered network device; and the second peered network device uses the updated control information to update a class tree associated with the first peered network device, wherein the class tree is maintained by the second peered network device.

22. The computer-readable non-transitory storage media of claim 17, wherein classifying a connection further comprises:
   receiving, by the first peered network device, a first message indicating that the connection is to be established;
   sending, by the first peered network device, a second message to one or more other peered network devices of the plurality of three or more peered network devices that is associated with the cluster indicating that the first peered network device seeks to classify the connection;
   sending, by the first peered network device, a third message to the one or more other peered network devices indicating that the classification of the connection is complete.

23. The computer-readable non-transitory storage media of claim 17, further comprising:
   storing, by the first peered network device, control information associated with the second peered network device;
   detecting, by the first peered network device, that the second peered network device has gone offline;
   updating, by the first peered network device, the control information associated with the second peered network device, based at least in part on network traffic:
      associated with a second connection formerly handled, at least in part, by the second peered network device; and
      occurring while the second peered network device is offline;
   detecting, by the first peered network device, that the second peered network device has come online; and
   sending, by the first peered network device to the second peered network device, the updated control information associated with the second peered network device.

* * * * *